United States Patent [19]

Hoffman

[11] 4,394,723

[45] Jul. 19, 1983

[54] POWER SUPPLY CIRCUIT

[75] Inventor: John P. Hoffman, Peoria, Ill.

[73] Assignee: Caterpillar Tractor Co., Peoria, Ill.

[21] Appl. No.: 275,075

[22] PCT Filed: Apr. 30, 1981

[86] PCT No.: PCT/US81/00578

§ 371 Date: Apr. 30, 1981

§ 102(e) Date: Apr. 30, 1981

[87] PCT Pub. No.: WO82/03954

PCT Pub. Date: Nov. 11, 1982

[51] Int. Cl.³ .................................... H02P 13/24
[52] U.S. Cl. .................... 363/87; 318/345 G; 318/803
[58] Field of Search ................. 307/358, 514; 318/345 G, 762, 803; 323/300, 320, 322; 363/84, 85, 87, 128, 129

[56] References Cited

U.S. PATENT DOCUMENTS

| | | | |
|---|---|---|---|
| 4,016,468 | 4/1977 | Graf | 363/129 |
| 4,017,744 | 4/1977 | Johnson | 363/160 X |
| 4,028,609 | 6/1977 | Deterino | 363/129 |
| 4,053,945 | 10/1977 | Dumas | 363/129 |
| 4,063,146 | 12/1977 | Oliver | 363/87 X |
| 4,169,372 | 10/1979 | Colwill et al. | 73/133 R |
| 4,347,562 | 8/1982 | Galloway | 363/87 |

*Primary Examiner*—William M. Shoop
*Attorney, Agent, or Firm*—Stephen L. Noe

[57] ABSTRACT

A power supply circuit (20) having an inductive load (12), three power lines (A,B,C) for conducting current of a 3-phase AC source, an SCR network (24) of six SCRs (1-6) for coupling the current of the source between the power lines (A,B,C) and the load (12), a phase sensor (30) for generating a reference signal in response to one reference phase voltage (AB) of the source, and a trigger circuit (35) for triggering "on" the SCRs (1-6) at predetermined phase angles relative to the voltage (AB). The power supply circuit (20) overcomes constraints such as load inductance which limit the rate of current build-up or decay through the load (12) by gating "on" the SCRs (1-6) at the predetermined phase angles to maximize such current build-up or decay.

12 Claims, 32 Drawing Figures

FIG_1A  FIG_1B

FIG_2A  FIG_2B

FIG_3A  FIG_3B

FIG_4A    FIG_4B

FIG_5A    FIG_5B

FIG_6A    FIG_6B

FIG_7A  FIG_7B

FIG_8A  FIG_8B

FIG_9A  FIG_9B

FIG_10A  FIG_10B

FIG_11A  FIG_11B

FIG_12A  FIG_12B

FIG_15

FIG_16A

FIG_16B

FIG_16C

| | | | | | | | |
|---|---|---|---|---|---|---|---|
| SCR 1 UP | | 11 | 21 | | | | |
| SCR 1 DN | | | | 39 | | | |
| SCR 2 UP | | | | 31 | 41 | | |
| SCR 2 DN | | | | | | 59 | |
| SCR 3 UP | 01 | | | | 51 | | |
| SCR 3 DN | | | 19 | | | | |
| SCR 4 UP | 01 | 11 | | | | | |
| SCR 4 DN | | | 29 | | | | |
| SCR 5 UP | | | 21 | 31 | | | |
| SCR 5 DN | | | | | 49 | | |
| SCR 6 UP | | | | 41 | 51 | | |
| SCR 6 DN | 09 | | | | | | |

FIG_16D

POWER SUPPLY CIRCUIT

DESCRIPTION

1. Technical Field

This invention relates generally to a power supply circuit and, more particularly, to a power supply circuit for supplying power to an inductive load in response to a 3-phase AC source.

2. Background Art

In many power supply circuits, the power supply can be controlled to adjust or change the current through the load. The power supply can be, for example, a DC supply generated from a 3-phase AC source and the load can be, for example, an inductive load. Current will build up or decay in response to the supply being coupled to or decoupled from the load.

Under certain conditions, it can be important to control the rate of change of current through the inductive load, e.g., to build-up or to decay very rapidly, the current through the inductive load. However, various problems or constraints limit the rate at which this build-up or decay of the current can occur. The constraints for current build-up and decay are the magnitude of the power supply voltage and the inductance of the inductive load. These constraints can make a power supply circuit unsuitable for any application in which the response time for achieving maximum current build-up or current decay must be very short.

As one example, the inductive load can be an eddy current dynamometer which is used to control the speed of an engine. The power supply can be a DC supply of one magnitude or polarity of voltage which is coupled to the inductive load to build up current through the load in response to a command for reduced engine speed and/or a DC supply of a different magnitude or polarity of voltage to the load to decay current through the load in response to a command for increased engine speed. But, the commanded engine speed may have to be reached so rapidly, that the response time for achieving current build-up or decay cannot occur sufficiently quickly for either command due to the above-mentioned constraints.

The present invention is directed to overcoming one or more of the problems as set forth above.

DISCLOSURE OF THE INVENTION

In one aspect of the present invention, a power supply circuit is provided, having a load, means for conducting current of a 3-phase AC source, and triggerable means for coupling the current of the 3-phase AC source between said conducting means and said load, the improvement comprising means for generating a reference phase signal in response to one reference phase voltage of the 3-phase AC source, and means for triggering said triggerable means at preselected phase angles of the 3-phase AC source relative to the reference phase signal to control the current through the load.

Several constraints, such as the magnitude of the power supply voltage and the inductance of the load, limit the rate of current build-up or decay of current through the load. The power supply circuit of the present invention couples the current of the 3-phase AC source between the coupling means and the load, at various phase angles relative to the reference phase voltage, to control the current through the load. A maximum rate of current build-up or decay through the load is obtained at preselected phase angles.

BRIEF DESCRIPTION OF THE DRAWINGS

FIGS. 1A–7A illustrate voltage waveforms of a 3-phase AC source used to explain the theory of operation of the present invention for control of current build-up through a load.

FIGS. 1B–7B show current flow through a circuit portion of a power supply circuit of the present invention at times corresponding to phase angles shown, respectively, in FIGS. 1A–7A;

FIGS. 8A–13A and FIG. 13A' illustrate voltage waveforms of the 3-phase AC source used to explain the theory of operation of the present invention for control of current decay through a load;

FIGS. 8B–12B show current flow through a circuit portion of the power supply circuit of the present invention at times corresponding to phase angles shown, respectively, in FIGS. 8A–13A;

BEST MODE FOR CARRYING OUT THE INVENTION

Figure 1A:
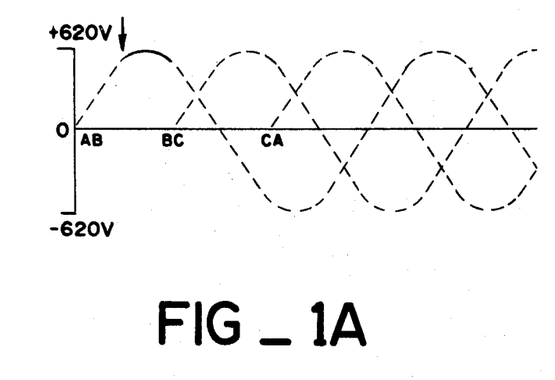
Figure 1B:
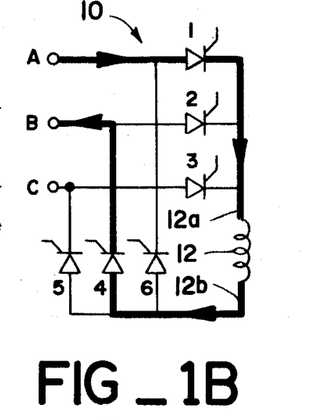

FIG. 1A shows voltage waveforms of a 3-phase AC source having a voltage A with respect to B or voltage AB, a voltage B with respect to C or voltage BC, and a voltage C with respect to A or voltage CA. FIG. 1B illustrates a circuit portion 10 of a power supply circuit to be fully described in connection with FIG. 15. Circuit portion 10 has three current carrying lines or conductors A, B, C, and a load 12, such as an inductive load, through which current can build-up or decay. Three silicon controlled rectifiers 1, 2, 3 have their cathodes connected in common to side 12a of load 12 and their anodes connected, respectively, to lines A, B, C. Three silicon controlled rectifiers 4, 5, 6 have their anodes connected in common to side 12b of load 12 and their cathodes connected, respectively, to lines B, C, A.

Voltage AB is followed in time or phase at 120° by voltage BC, which is followed in time or phase at an additional 120° by voltage CA. At the time or phase angles shown by the arrow in FIG. 1A, voltage AB is positive, increasing, and approaching a peak value or maximum. If, at this time, trigger or gate pulses are supplied simultaneously to the control gates of SCR 1 and SCR 4, then current will begin to flow on line A, through SCR 1, load 12 and SCR 4 onto line B, as shown in FIG. 1B.

Figure 2A:
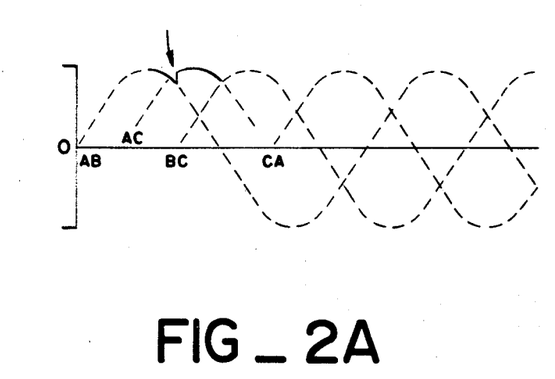
Figure 2B:
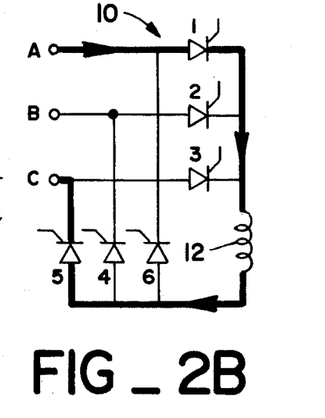

At a next time or phase angle, shown by the arrow in FIG. 2A, a voltage AC, which is the inverse of voltage CA, becomes more positive than voltage AB and is approaching a maximum. If, at this time, gate pulses are supplied to the control gates of SCR 1 and SCR 5, then, as shown in FIG. 2B, current now will flow on line A, through SCR 1, load 12 and SCR 5 onto line C. The current flowing through SCR 4, which had been gated "on" at the time shown in FIG. 1A, is now insufficient for SCR 4 to remain on, which therefore will turn off.

Figure 3A:
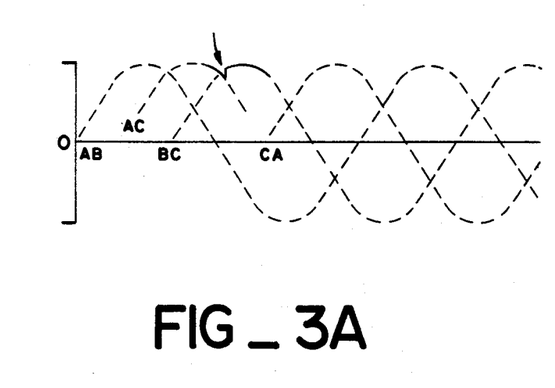
Figure 3B:
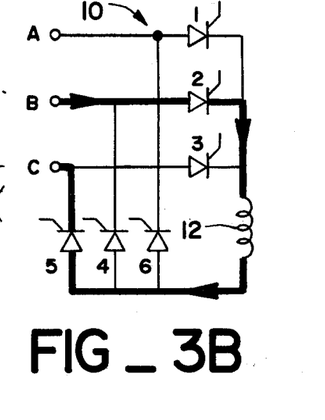
Figure 4A:
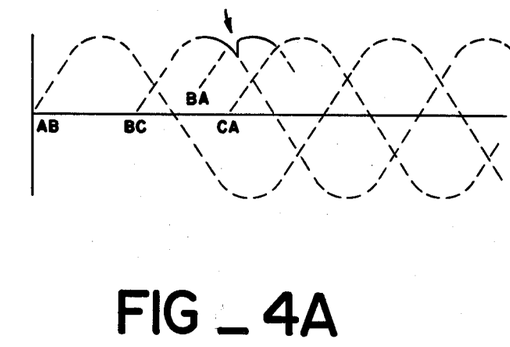
Figure 4B:
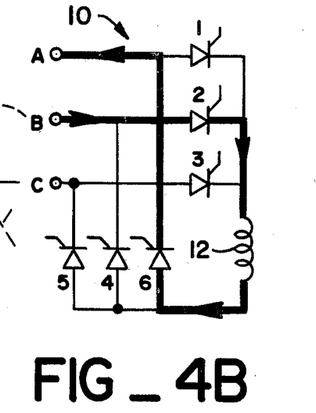
Figure 5A:
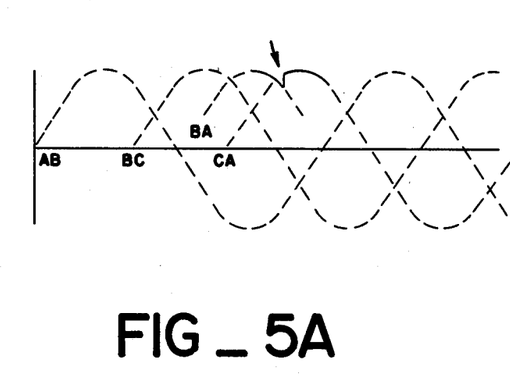
Figure 5B:
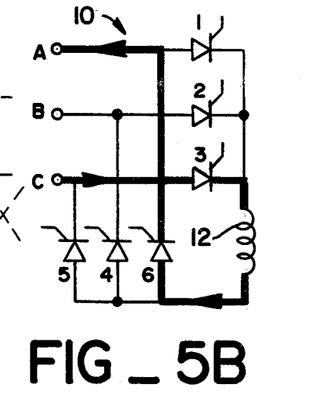
Figure 6A:
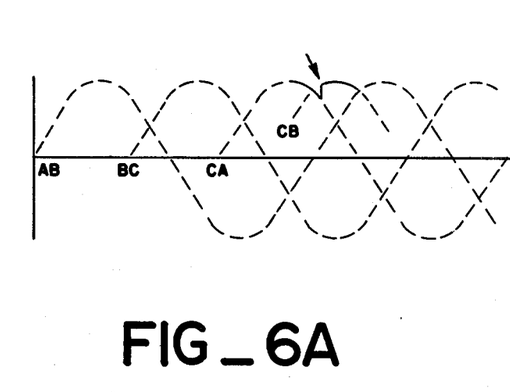
Figure 6B:
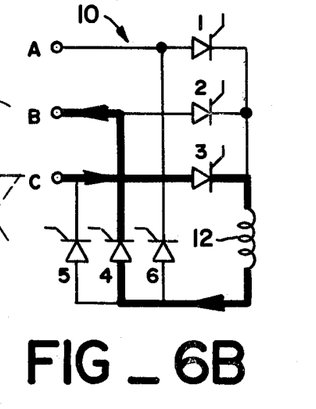

At the next time, shown by the arrow in FIGS. 3A, voltage BC becomes more positive than voltage AC and is approaching a maximum. If, at this time, SCR 2 and SCR 5 are gated "on", current will flow on line B, through SCR 2, load 12, and SCR 5 to line C. The current that had been flowing on line A, as shown in FIG. 2B, will become zero so that SCR 1 turns off. Similarly, at succeeding times indicated by the arrows in FIGS. 4A–6A, the voltages BA, CA, CB are the most positive and approaching a maximum. If, at these respective times, SCR 2 and SCR 6, SCR 3 and SCR 6, and SCR 3 and SCR 4 are gated "on", then current will flow through load 12 as shown in FIGS. 4B–6B.

Figure 7A:
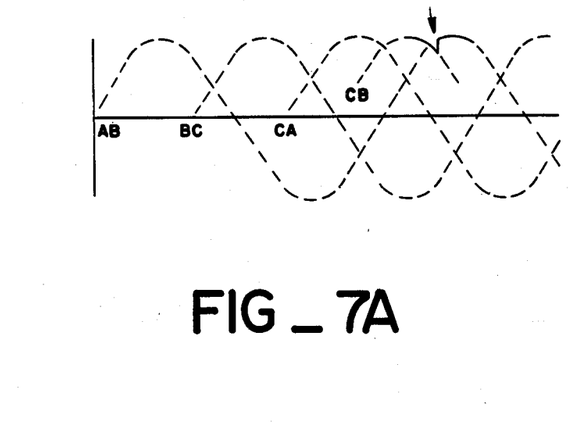
Figure 7B:
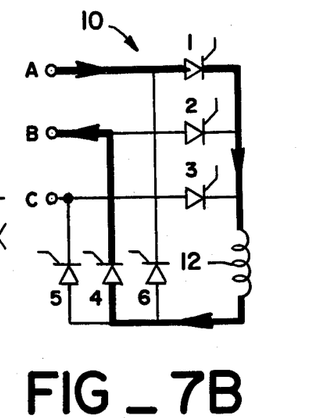

Then, at the time indicated by the arrow in FIG. 7A, voltage AB is again the most positive and approaching a maximum, as shown in FIG. 1A, Consequently, at this time, SCR 1 and SCR 4 are gated "on" and the above-described operational sequence repeats itself.

The operational sequence of FIGS. 1A–7A and FIGS. 1B–7B demonstrates that current through the load 12 is increased by gating "on" the SCRs 1–6 at the proper time and in the proper order. In fact, if the SCRs 1–6 are gated "on" at these particular times, current build-up through the load 12 will occur at a maximum rate, given the magnitude of the 3-phase AC source voltage and the inductance of the load 12. It can be seen from FIGS. 1A–7A, that the times or phase angles at which the SCRs 1–6 are gated "on" are relative to the start of one voltage of the 3-phase AC source, e.g., voltage AB.

Figure 8A:
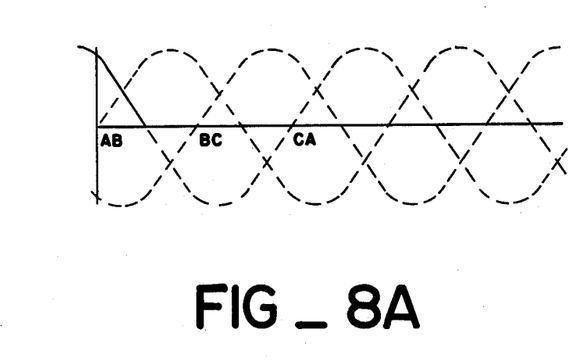
Figure 8B:
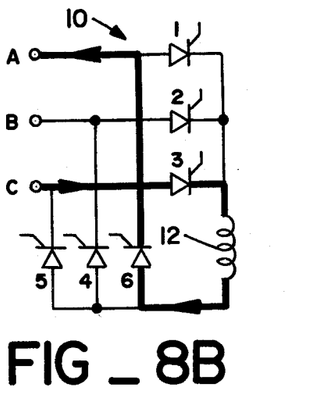
Figure 9A:
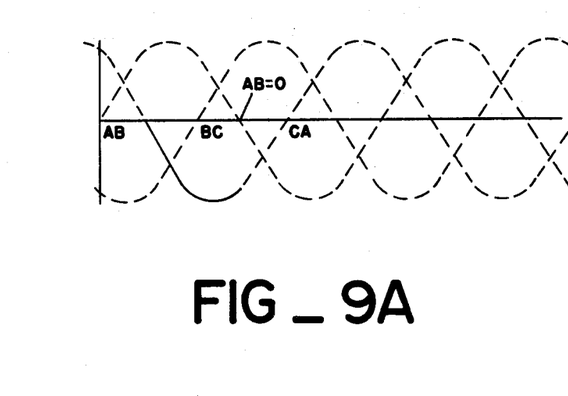
Figure 9B:
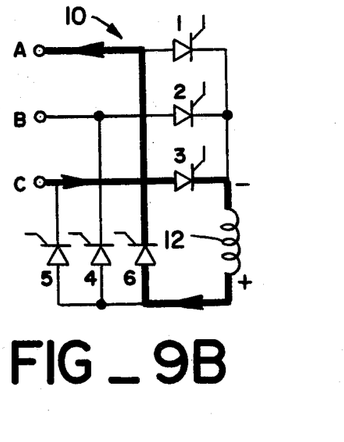

An operational sequence now will be described for the decay of current through the load 12. Assume that during the time interval indicated by the full line in FIG. 8A, when SCR 3 and SCR 6 are conducting as shown in FIG. 8B, the energy built up in the load 12 should be quickly dissipated, i.e., current through the load 12 should decay rapidly. To accomplish this, no more SCR gate pulses as given in the above-described sequence for current build-up are sent to SCRs 1–6. Rather, SCR 3 and SCR 6, having been gated "on", will continue to couple current through load 12 until the time when voltage CA=0 and soon starts going negative, as shown in FIG. 8A and FIG. 9A. Normally, SCR 3 and SCR 6 would now be reverse biased and cease conducting current. However, the load 12, having inductance, now becomes a source instead of a load, as indicated by the voltage polarity signs shown on load 12 in FIG. 9B. Therefore, SCR 3 and SCR 6 remain forward biased by the source-effect of load 12 so that current continues to flow into line A.

Figure 10A:
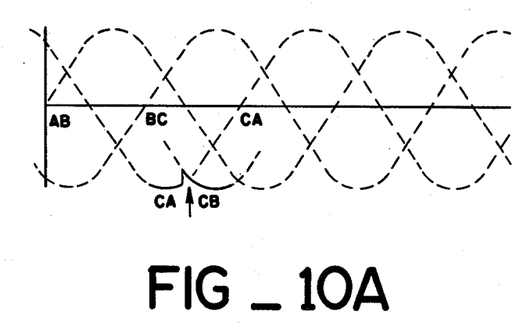
Figure 10B:
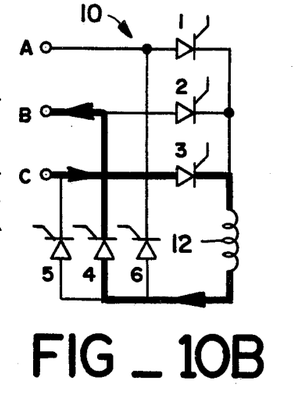

Next, at the time shown by the arrow in FIG. 10A, voltage CB is less negative than voltage CA but is about to become more negative. At this time, SCR 4 is gated "on" and the current from the load 12 will flow through SCR 3 and SCR 4, as shown in FIG. 10B. If voltage CB were not less negative than voltage CA at the time SCR 4 is triggered "on", the current would not transfer from SCR 6 to SCR 4. SCR 6 soon turns off since it now becomes deprived of the holding current needed to keep it on.

Figure 11A:
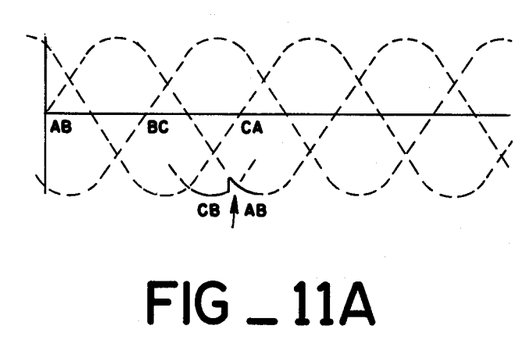
Figure 11B:
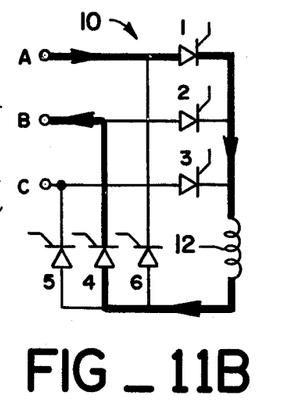

Next, as shown by the arrow in FIG. 11A, voltage AB is about to become more negative than volage CB. Therefore, at this time, SCR 1 is gated "on" and current now flows through SCR 1 and SCR 4, as shown in FIG. 11B.

Figure 12A:
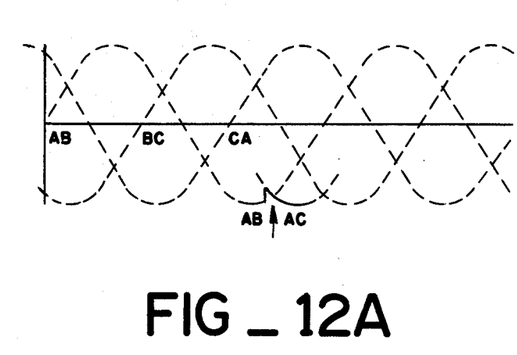
Figure 12B:
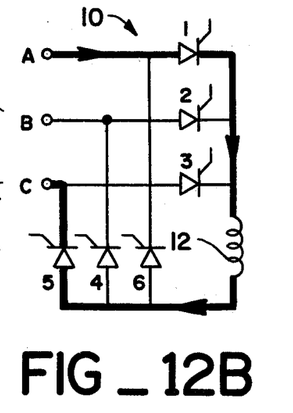

Next, as shown by the arrow in FIG. 12A, and in FIG. 12B, phase AC is about to become most negative and current shifts from phase AB to phase AC.

The above-described operational sequence for current decay, as shown in FIG. 10A through FIG. 12B, repeats until the load 12 can no longer forward bias the SCRs 1–6 or until it is required again to build up current in the load 12. Thus, the energy in the load 12 is transferred efficiently to the lines A, B, C by forcing current into whichever of the three phase voltages is the most negative. Again, it can be seen from FIGS. 8A–12A that the times or phase angles at which the SCRs 1–6 are gated "on" are relative to the start of one voltage of the 3-phase AC source, e.g., voltage AB.

Figure 13A:
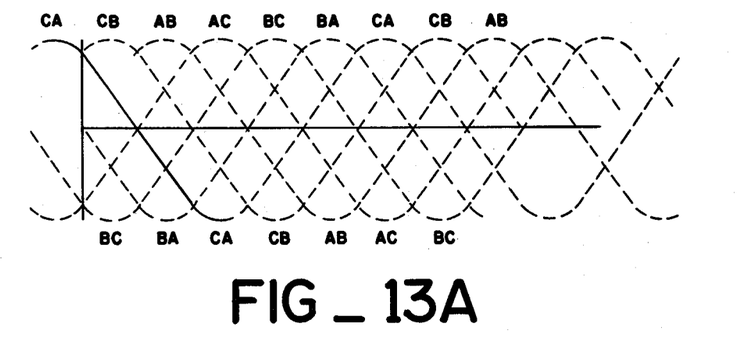

The transition from the current-up mode to the current-down mode is shown in piecemeal fashion in FIG. 8A to FIG. 10A. The overall transition is shown in FIG. 13A. In the example given, phase CA is positive and conducting when the current-down mode becomes active. It is equally likely that any of the phases may be positive and conducting when the current-down mode becomes active. In any case, the result will differ from FIG. 13A only in that a phase other than phase CA may be conducting as its terminal voltage changes from positive to negative.

There is also a method of transition from the current-down mode to the current-up mode. For the configuration chosen, an example of a transition is shown in FIG. 13A'. A less-abrupt transition method is possible including one similar to the up-to-down transition in which the conducting phase is allowed to naturally commutate from a negative to positive polarity. The method chosen here is simplest to implement and is very fast. While other transitions would be more expensive, and slower, they would be desirable if necessary to stay within the di/dt specifications of the SCRs used.

Figure 14A:
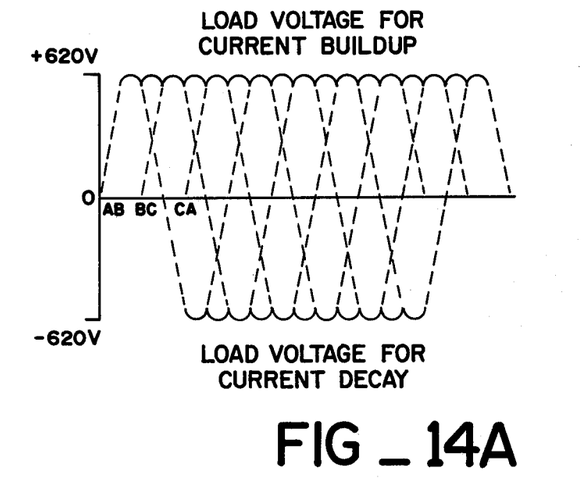
FIG. 14A is a composite illustration for explaining current build-up and current decay through a load.

FIG. 14A is a composite drawing which shows the actual voltage applied during current build-up in the load 12, and the voltage across the load 12 during current decay. It therefore can be seen that by gating "on" the various SCRs 1–6 at the times described, rapid build-up of current in the load 12 or rapid decay of the current in the load 12 can be achieved. In other words, by so gating "on" the SCRs 1–6, the current through the load 12 is controlled, either for current build-up or for current decay. In fact, the particular relative phase angles shown for gating "on" the SCRs 1–6 correspond to a maximum or fastest rate of current build-up or decay; however, as will be discussed, the relative phase angles of gating "on" the SCRs 1–6 can be selected to control this rate for any system requirements.

Figure 15:
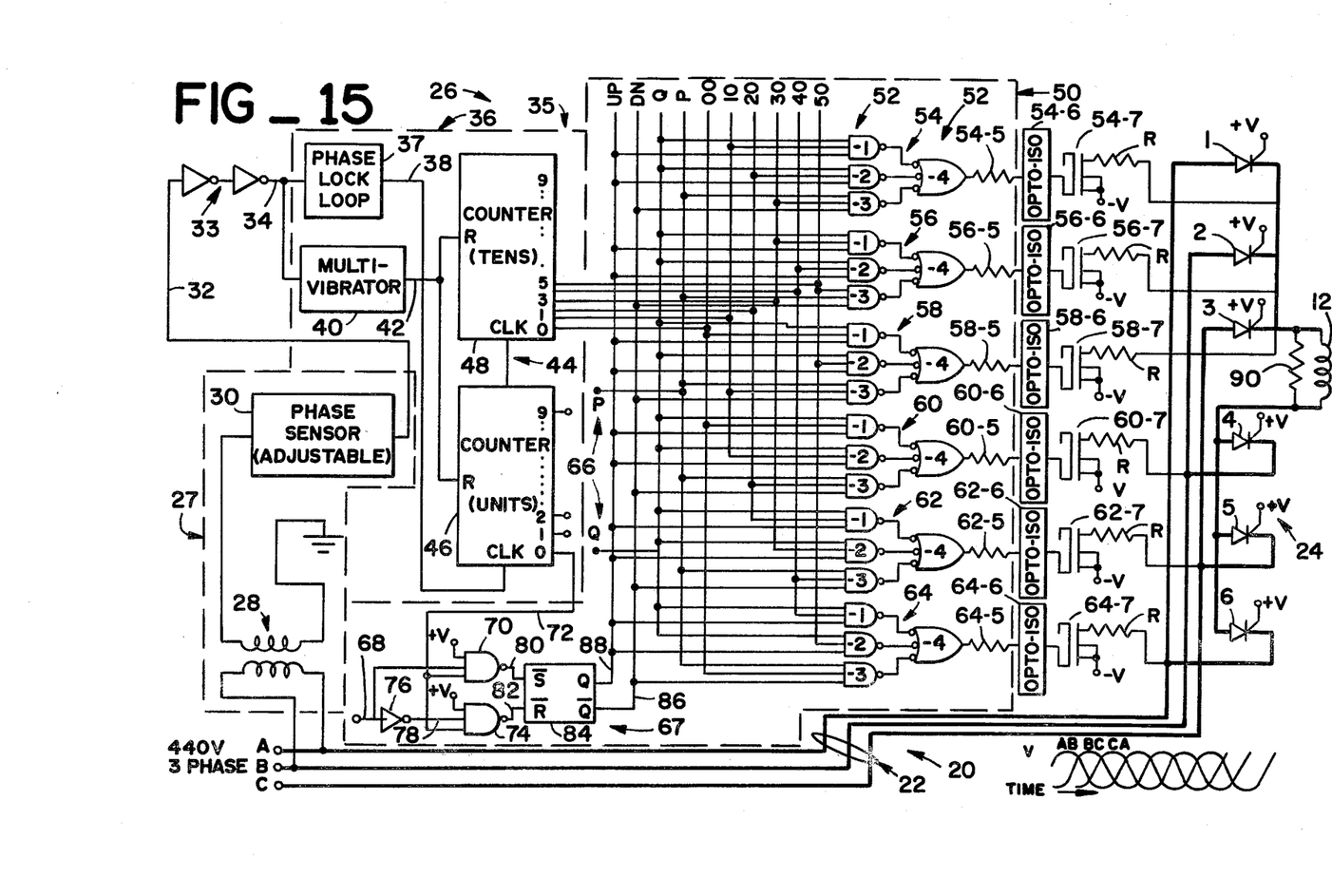
FIG. 15 is a schematic illustration of an embodiment of the present invention.

FIG. 15 illustrates one embodiment of a power supply circuit 20 which includes the load 12 and means 22 for conducting current of a 60 cycle, 3-phase AC source, which includes lines A, B, C. A triggerable means 24 couples the current of the 3-phase AC source between the conducting means 22 and the load 12. The means 24 includes SCRs 1–6 which are connected to lines A, B, C as previously described. The remainder of power supply circuit 20 constitutes a control means 26 which controls the triggering or gating "on" of SCRs 1–6 to perform the operational sequences described above for build-up or decay of current through load 12.

Control means 26 includes a means 27 for generating a reference signal in response to one reference phase voltage of the 3-phase AC source, e.g., voltage AB. A transformer 28 of means 27 has its primary winding connected to lines A, B and steps down the sinusoidal reference phase voltage AB to, for example, 120 volts. An adjustable phase sensor 30 of means 27 receives the stepped-down sinusoidal reference voltage AB from transformer 28 and produces a ±15 VAC, 60 Hz. square wave version or reference signal of reference phase voltage AB on an output line 32 that is approximately 180° out-of-phase from the voltage AB. Phase sensor 30 is adjustable with a potentiometer (not shown) to adjust the phase of the reference signal on line 32 to the needed phase relationship. A pair of Schmitt triggers 33 additionally square and produce the reference signal on an output line 34.

Control means 26 also includes a means 35 for triggering or gating "on" the triggerable means 24 at predetermined phase angles of the 3-phase AC source relative to the reference phase voltage AB and in response to the reference signal on line 34 to control the conduction of current through SCRs 1-6. A dividing means 36 of triggering means 35 divides a cycle of the reference phase voltage AB into a plurality of phase angles, e.g., in 6° increments, and generates signals representing the plurality of phase angles. A phase lock loop 37 of dividing means 36 locks on the incoming 60 Hz. reference signal on line 34 and multiples this signal by 60 to produce a clock signal of 3600 Hz. on an output line 38. A monostable multivibrator 40 is triggered by the low to high transition or beginning of each 60 Hz. reference signal on line 34 to produce a reset pulse on an output line 42.

A counter means 44 of dividing means 36 counts the pulses of the 3600 Hz. clock signal being received on line 38 and includes a units counter 46 having counter states or outputs 0-9 and a tens counter 48 having counter states or outputs 0-5. Each one count of the counter means 44 is equal to 6° of phase as measured from the positive swing of the reference phase voltage AB. Thus, for example, a counter state of 8 equals 48° and a counter state of 30 equals 180° from this positive swing. Each such counter output thus is a signal representing one of these pluralities of phase angles of reference phase voltage AB. Counter 46 and counter 48 are reset by 0 by the output pulse of multivibrator 40 on the line 42. Consequently, counter means 44 will have counted to 60 when counter 46 and counter 48 are reset to 0, which count equals one full cycle or 360° of the reference phase voltage AB.

A decoding means 50 of triggering means 35 decodes the signals representing the plurality of phase angles, i.e., the output of counter means 44, and generates SCR triggering or gating pulses to gate "on" selected SCRs 1-6 at these times or phase angles. Decoding means 50 has a decoder logic network 52 which includes six sets of gates 54, 56, 58, 60, 62, 64. Each set 54-64 has three NAND gates whose outputs drive an Or gate. Thus, for example, set 54 has three NAND gates 54-1, 54-2 and 54-3 whose outputs drive an Or gate 54-4, set 56 has three NAND gates 56-1, 56-2 and 56-3 whose outputs drive an Or gate 56-4, etc.

Each set 54-64 of three NAND gates has inputs connected to the various outputs of counter 46 and counter 48, as shown in FIG. 15. Thus, for example, gate 54-1 has one input connected to counter output 10, gate 54-2 has one input connected to counter output 20, and gate 54-3 has one input connected to counter output 30. Also, for example, gate 62-1 has one input connected to counter output 20, gate 62-2 has one input connected to counter output 30, and gate 62-3 has one input connected to counter output 40.

Decoding means 50 also has means 66 for preselecting any of the plurality of outputs of counter means 44 to decode, and hence any of the phase angles of reference phase voltage AB. Preselecting means 66 includes jumper selectable line P and jumper selectable line Q. Line P is selectively connectable to units counter 46 and activates one of the NAND gates in each of the sets 54-64 for the purpose of controlling the rate of current decay. Thus, line P is connectable to any one of counter outputs 1-9 of counter 46 and is connected as an input to gate 54-3, gate 56-3, gate 58-3, etc. Line Q is selectively connectable to units counter 46 and activates the remaining two NAND gates of each set 54-64 for the purpose of controlling the rate of current build-up. Thus, line Q is selectively connectable to any one of counter outputs 1-9 of counter 46 and is connected as an input to gate 54-1 and gate 54-2, an input to gate 56-1 and 56-2, an input to gate 58-1 and gate 58-2, etc.

The decoding means 50 also has a means 67 for selectively activating the decoder logic network 52 to decode the outputs of counter means 44 for the purpose of producing current build-up or current decay. Means 67 has an input control line 68 that receives a high signal or logic 1 for current build-up and a low signal or logic 0 for current decay. A NAND gate 70 has one input connected to line 68, another input connected to the count 0 of counter 46 over a line 72, and yet another input connected to +V. A NAND gate 74 has one input connected to line 72 and another input connected to +V. Yet another input to NAND gate 74 is the output of a Schmitt trigger 76 over a line 78, whose input is the high or low signal on line 68.

The signal on line 68 sometimes will be logic 0; therefore the output of gate 70 on a line 80 will be logic 1. When the signal on line 68 goes to logic 1, the output of gate 70 on line 80 will be logic 0 as soon as counter 46 is reset to 0 to produce a logic 1 on line 72. The output of gate 74 on a line 82 goes to logic 0 when the signal on line 68 is logic 0 and counter 46 is reset to 0. The output on line 80 and the output on line 82 are both high until counter 46 is reset to 0, at which time these outputs are opposite from each other, depending on the high/low level of the signal on line 68.

An $\bar{R}$-$\bar{S}$ flip-flop 84 of means 67 has a reset input $\bar{R}$ coupled to line 82 and a set input $\bar{S}$ coupled to line 80. The output $\bar{Q}$ of flip-flop 84 is connected to a "down" line 86 to activate decoder logic network 52 for producing current decay, whereas the output Q of flip-flop 84 is connected to an "up" line 88 to activate network 52 for producing current build-up. Specifically, "down" line 86 is connected to gate 54-3, gate 56-3, gate 58-3, etc. whereas "up" line 88 is connected to gate 54-1 and gate 54-2, gate 56-1 and gate 56-2, etc.

When the signal on line 82 is low at input $\bar{R}$, the output $\bar{Q}$ on line 86 will go high and will remain high until a low occurs on line 80 at the input $\bar{S}$. At this time, the output Q on line 88 will go high and remain high until a low occurs again at input $\bar{R}$. Consequently, as long as the signal on line 68 remains low, a series of high-to-low pulses appears on line 82 at input $\bar{R}$ each time counter 46 is reset to 0. The output $\bar{Q}$ on line 86 will remain high and the output Q will remain low. Then, should the signal on line 68 go high and remain high, a series of high-to-low pulses will occur on line 80 each time counter 46 is reset to 0, whereby the output Q will go high and remain high, and the output $\bar{Q}$ will go low. This latter state of the flip-flop 84 will continue until the signal on line 68 again goes low and the counter 46 is reset to 0. Thus, the means 67 for selectively activating decoder logic network 52 for current build-up or current decay (1) latches the logic 1 or logic 0 signal on line 68 via flip-flop 84 until the logic 0 or logic 1 occurs, respectively, (2) ensures that the output Q on line 86 and output Q on line 88 have at least a minimum pulse width equal to the time needed to reset counter 46 to 0, and (3) ensures that all transitions between conditions of current build-up and current decay begin at a count whose least significant digit is zero which is the start of reference phase voltage AB or at 60° intervals thereafter.

In the overall operation of decoding means 50, assume that a logic 1 appears on line 68 and that counter 46 is reset to 0. Therefore, flip-flop 84 will be set to produce a high on line 88 and a low on line 86. Consequently, two of each of the NAND gates in each set 54-64 will have an active high from the signal on line 88. For example, gate 54-1 and gate 54-2 will have an active high from line 88 and gate 54-3 will be deactivated by the low on line 86, gate 56-1 and gate 56-2 will have an active high from line 88 and gate 56-3 will be deactivated by the low on line 86, etc.

Assume also, for example, that line P has been connected to counter output 9 and line Q has been connected to counter output 2 of counter 46. Then, when counter means 44 is clocked to a count of 12, gate 54-1 has a high at all three of its inputs. Gate 54-1, therefore, produces a low pulse to drive or activate gate 54-4 which produces a high pulse on an output line 54-5. Then, when the counter means 44 reaches a count of 22, gate 54-2 has a high at all three of its inputs, resulting in a low pulse to drive gate 54-4 again at this time to produce another high pulse on output line 54-5.

Thereafter, when counter means 44 is clocked to a count of 32, gate 56-1 has a high at all three of its inputs to produce a low pulse which drives gate 56-4 to produce a high pulse on an output line 56-5. Then, when counter means 44 is clocked to a count of 42, gate 56-2 has a high at all three of its inputs to produce a low pulse which drives gate 56-4 again to produce a high pulse on line 56-5 at this time. A similar sequence occurs as the counter means 44 is clocked to count from 0 through to 60 before it is reset to 0. Each gate 58-4, 60-4, 62-4 and 64-4 also will be driven twice during this counting sequence at the times or counter states indicated by the line connections shown for decoding means 50.

Now assume that a logic 0 occurs on line 68 and that counter 46 has been reset to 0. Flip-flop 84 now will be reset to produce a high on line 86 and a low on line 88. Now, one NAND gate of each set 54-64 will have an active high from the signal on line 86, i.e., gate 54-3, gate 56-3, etc., while the remaining two NAND gates of each set 54-64 will be deactivated by the low on line 88.

Then, for example, when counter means 44 is clocked to a count of 29, gate 60-3 will have a high at all three inputs to produce a low pulse which drives gate 60-4 to produce a high pulse on line 60-5 at this time. When, for example, counter means 44 is clocked to a count of 59, gate 56-3 will have a high at all three inputs to produce a low pulse which drives gate 56-4 to produce a high pulse on line 56-5 at this time. A similar action occurs with gate 54-3 and gate 54-4, gate 58-3 and gate 58-4, etc. as the counter means 44 is clocked from count 0 to count 60.

An opto-isolator 54-6 responds to the high pulses on line 54-5 to gate "on" a field effect transistor or FET 54-7 having a resistor R. Five additional opto-isolators 56-6 to 64-6, FETs 56-7 to 64-7 and resistors R are coupled to respective lines 56-5 through 64-5, as shown in FIG. 15.

When a high pulse appears on, for example, line 54-5, opto-isolator 54-6 gates on FET 54-7. Consequently, SCR gate current will flow from +V into the gate of SCR 1, out the cathode of SCR 1, through resistor R and FET 54-7 to −V. At this time, therefore, SCR 1 will be triggered or gated "on" to conduct current of the 3-phase AC source, as will be further described. Similarly, SCRs 2-6 are triggered "on" at the time a high pulse appears on lines 56-5 to 64-5, respectively.

Figure 16A:
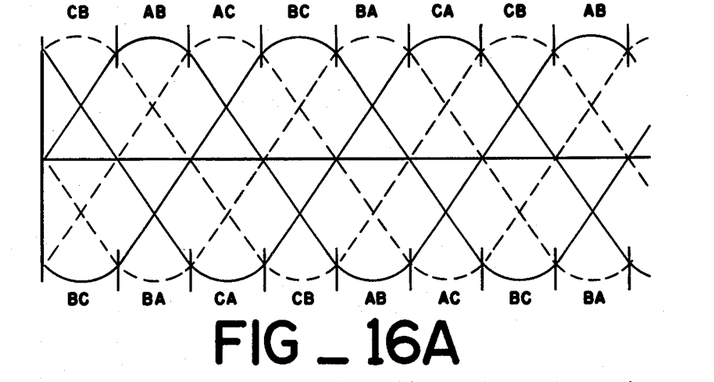
FIGS. 16A–16C show the relationship between phase voltages of the 3-phase AC source, phase angles and counts of a counter.
Figure 16B:
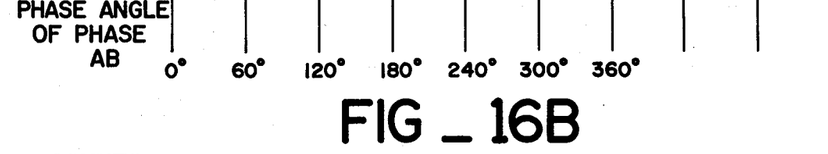
Figure 16C:
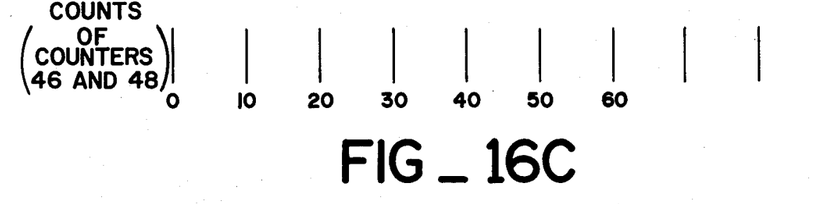
Figure 16D:
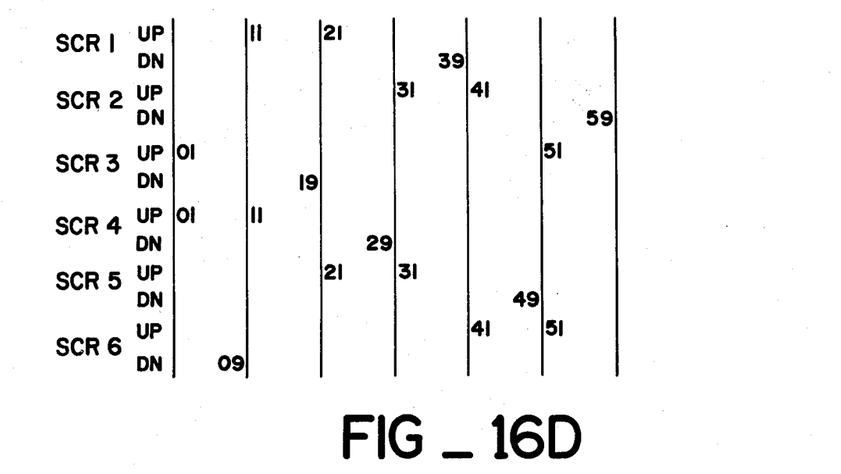
FIG. 16D is a tabulation of counter states corresponding to a maximum rate of current build-up and decay through a load.

FIG. 16A again shows the waveform of the 3-phase AC source having voltage AB, voltage BC, voltage CA and the inverse of these voltages. FIG. 16B shows the phase angles of the reference phase voltage AB. FIG. 16C illustrates the count in counter means 44 at the various phase angles shown in FIG. 16B. For example, count 10 corresponds to 60°, count 20 to 120°, etc. FIG. 16D is a chart showing the count of the counter means 44 at which the SCRs 1-6 should be triggered "on" to maximize the rate of build-up of current through the load 12 or the rate of decay of current through the load 12. Thus, FIG. 16D indicates that if SCR 1 and SCR 4 were triggered "on" at a count of 11, this corresponds to the time at which voltage AB is the most positive, as shown in FIG. 1A. If SCR 5 were triggered "on" at a count of 49, this corresponds to the time voltage AC is about to become most negative, as shown in FIG. 12A.

Industrial Applicability

As already indicated, the load 12 can be an inductive load such as an eddy current dynamometer which is used to control the speed of an engine by loading. In response to a command signal for reduced engine speed, i.e., a high on line 68, power supply circuit 20 can rapidly build-up current through load 12 to load the engine. In response to a command signal for increased engine speed, i.e., a low on line 68, power supply circuit 20 can rapidly decay current through load 12 to unload the engine.

To maximize the rate of current build-up and the rate of current decay, the NAND gates of the six sets 54-64 are connected to the tens counter 48, as shown in FIG. 15. The line Q is selectively coupled to the count 1 of counter 46 while line P is selectively coupled to the count 9 of counter 46.

Now assume that the engine should be quickly loaded, by quickly increasing the current through the dyno field coil or load 12, to rapidly decrease the engine speed. A logic 1 command signal will then appear on line 68. Also assume that the 60 Hz. reference signal on line 34 has been generated from the reference phase voltage AB so that multi-vibrator 40 has been triggered to reset counter 46 to zero and that phase lock loop 36 produces the 3600 Hz. clock on line 38. Therefore, at this time flip-flop 84 is toggled or set to produce a high on line 88 to activate gates 54-1 and 54-2, gates 56-1 and 56-2, etc.

Now, counter means 44 is clocked to count pulses at the rate of 3600 Hz. When counter means 44 reaches count 11, gate 54-1 and gate 60-2 are enabled. Consequently, gate 54-4 and gate 60-4 will be driven to produce a trigger or gate pulse on line 54-4 and line 60-5, which results in SCR 1 and SCR 4 being triggered "on" at a phase angle of about 66° relative to the reference phase voltage AB. A current path is now completed from line A, through SCR 1, load 12, SCR 4 and back to line B. This follows the path described in connection with FIG. 1A and FIG. 1B.

Then, when counter means 44 is clocked in a count of 21, gate 54-2 is enabled, as is gate 62-1. Therefore, gate 54-4 and gate 62-4 are driven to produce a gate pulse on line 54-5 and line 62-5, respectively. Consequently, SCR 1 and SCR 5 are turned "on" at the phase angles of about 126° relative to the reference phase voltage AB. Current now will flow from line A through SCR 1, load 12, and SCR 5 to line C. This is the current path shown in FIG. 2A and FIG. 2B.

Next, when counter means 44 is clocked to a count of 31, gate 56-1 and 62-2 are enabled, ultimately resulting in SCR 2 and SCR 5 being turned "on". Current now will flow from line B through SCR 2, load 12, SCR 5 and back to line C. This is the condition indicated in FIG. 3A and FIG. 3B.

It now can be seen that as the counter means 44 is clocked through to a count of 60, which corresponds to a full 360° of the reference phase voltage AB, the SCRs 1-6 will be triggered "on" in accordance with the sequence described in FIG. 1A-FIG. 7A and FIG. 1B-FIG. 7B. The result is a rapid build-up of current in the load 12.

Now assume that with the engine being sufficiently loaded by the build-up of current through the load 12, it is desired to rapidly decrease the current through the field coil or load 12 so that engine speed can increase rapidly. A logic 0 command signal is now produced on line 68 and, when counter means 44 next counts to zero, flip-flop 84 will be reset to produce a high on line 86. This puts means 50 in the current-down mode.

Assume, for example, that line 68 goes low at such a time that line 86 goes high when counter means 44 is reset to count zero at the start of reference phase AB, causing decoding means 50 to change from a current-up mode to a current-down mode. As shown in FIG. 8A and FIG. 8B, conduction is by phase CA and SCR 3 and SCR 6 at this time. As time proceeds, and as shown in FIG. 16C and FIG. 16D, SCR 6 will be gated "on" at count 9 and SCR 3 will be gated "on" at count 19. Since SCR 6 and SCR 3 were already conducting, there is no change in current path due to gating at count 9 and count 19. This time interval corresponds to the example of a current-up to current-down transition shown in FIG. 13A. The example here, in which gating pulses cause no current-path changes, is unique to the up-to-down mode changes. That is, it does not happen in steady-state conditions or during the down-to-up mode conditions, each of which is discussed elsewhere. For this example, the first current-path-changing trigger occurs at count 29 and is applied to SCR 4 with results indicated in FIG. 10A and FIG. 10B.

Returning to typical steady state down-mode operation, when counter means 44 is clocked, for example, to a count of 39, gate 54-3 is enabled to drive gate 54-4 to produce a gate pulse on line 54-5. As a result, SCR 1 is triggered "on" at a phase angle of about 234° relative to reference phase voltage AB, as shown in FIG. 11A and FIG. 16A. A current path is now produced from line A through SCR 1, load 12, SCR 4 and back to line B. This corresponds to the path indicated in FIG. 11B.

Next, when counter means 44 is clocked to a count of 49, gate 62-3 is enabled to drive gate 62-4 to produce a gate pulse on line 62-5. Consequently, SCR 5 is triggered "on" at this time corresponding to a relative phase angle of about 294°, as shown in FIG. 12A and FIG. 16A, to produce a current path from line A, through SCR 1, load 12, SCR 5 and back to line C, as indicated in FIG. 12B.

It can now be seen that as counter means 44 is clocked from count 0 through count 60, the SCRs 1-6 will be triggered "on" to maximize the rate of current decay through load 12.

Line P and line Q have been described as being selectively connected to count 1 and count 9 of counter 46 to maximize the rate of current build-up and rate of current decay through the load 12. Line P and line Q can be selectively coupled to any count of counter 46 to adjust the rate of current build-up or the rate of current decay, as may be needed for a particular application of power supply circuit 20.

A resistor 90 is connected across load 12 because of the combination of SCR characteristics and large inductance of load 12. Due to the magnitude of the voltage of the 3-phase AC source, current may not build up to the SCR holding current during one SCR gate pulse; therefore, the SCRs may not latch under this condition. By using resistor 90, the current through the SCRs is the sum of the current through load 12 and resistor 90, which produces sufficient SCR holding current.

In summary, the constraints of magnitude of the 3-phase AC source voltage and inductance of the load 12, which limit the rate of change of current through load 12, are alleviated by the power supply circuit 20. By controlling the phase angles relative to the reference phase voltage AB at which the SCRs 1-6 are triggered "on", a maximum or any desired rate of current build-up and/or decay through load 12 can be achieved.

The power supply circuit 20 is of the full-on, full-off form. It applies the peak value of the 3-phase AC line voltage to its load 12, one polarity of the voltage for the full-on mode and the opposite polarity for the full-off mode. This is shown graphically in FIG. 14A. In the full-off mode the peak line voltage is applied to the load 12 until the load current decreases to zero. Then the applied voltage goes to zero.

The power supply circuit 20 is able to cause quick current build-up or quick current decay by applying a voltage high enough to get a desired rate-of-change of current through the inductive load 12. For a given load time-constant, the absolute maximum rates of current rise and decay are determined by the magnitude of the 3-phase source voltage. In a number of instances, this applied voltage may be too high to keep applied indefinitely. Therefore, power supply circuit 20 might be used with appropriate other circuitry (not shown) to prevent current or power levels from becoming too large.

Very high reliability is obtained with this power supply circuit 20 because the only components which handle load current and/or voltage are SCRs. In the current-up mode, in which line 68 is high, the circuit approximates a simple full-wave 3-phase rectifier. However, in the current-down mode, in which line 68 is low, the concept is considerably more complex. By making use of the unique properties of inductance and of SCRs, a reverse voltage is applied to the load 12 until the current becomes zero.

Other aspects, objects and advantages of the present invention can be obtained from a study of the drawings, the disclosure and the appended claims.

I claim:

1. In a power supply circuit (20) having a load (12), means (22) for conducting current of a 3-phase AC source, and triggerable means (24) for coupling the current of the 3-phase AC source between said conducting means (22) and said load (12), the improvement comprising:
- (a) means (27) for generating a reference signal in response to one reference phase voltage (AB) of the 3-phase AC source; and
- (b) means (35) for triggering said triggerable means (24) at predetermined phase angles of the 3-phase AC source relative to the reference phase voltage (AB) and in response to the reference signal to control the current through said load (12), wherein said means (35) includes:
  - (i) means (36) for dividing a cycle of the one reference phase voltage (AB) into a plurality of phase angles and generating signals representing the plurality of phase angles;
  - (ii) a decoder logic network (52) being adapted to decode the signals representing the plurality of phase angles; and
  - (iii) means (67) for selectively activating said decoder logic network to decode the signals representing the phase angles to control the build-up or decay of the current through said load (12).

2. In a power supply circuit (20) according to claim 1 wherein said decoder logic network (52) includes means (66) for preselecting any of the signals representing the plurality of phase angles.

3. In a power supply circuit (20) having a load (12), means (22) for conducting current of a 3-phase AC source, and triggerable means (24) for coupling the current of the 3-phase AC source between said conducting means (22) and said load (12), the improvement comprising:
- (a) means (27) for generating a reference signal in response to one reference phase voltage (AB) of the 3-phase AC source; and
- (b) means (35) for generating a plurality of triggering signals at the predetermined phase angles and triggering said triggerable means (24) at predetermined phase angles of the 3-phase AC source relative to the reference phase voltage (AB) and in response to the reference signal to control the current through said load (12), wherein said means (35) includes:
  means (36) for dividing a cycle of the one reference phase voltage (AB) into a plurality of phase angles and generating signals representing the plurality of phase angles; and
  means (50) for decoding the signals representing the plurality of phase angles and preselecting any of the signals representing the plurality of phase angles.

4. A power supply circuit (20) comprising:
- (a) first, second and third conductors (A,B,C) being adapted to carry current of a 3-phase AC source;
- (b) an inductive load (12) having a first side (12a) and a second side (12b);
- (c) means (24) for coupling the current of the 3-phase AC source between said first, second and third conductors (A,B,C) and said inductive load (12), including:
  - (i) first, second and third silicon controlled rectifiers (1,2,3) having anodes connected to said first, second and third conductors (A,B,C), respectively, cathodes connected in common to said first side (12a) of said inductive load (12), and control gates; and
  - (ii) fourth, fifth and sixth silicon controlled rectifiers (4,5,6) having anodes connected in common to said second side (12b) of said inductive load (12), cathodes connected to said second, third and first conductors (B,C,A), respectively, and control gates;
- (d) means (27) for sensing one reference phase voltage (AB) of the 3-phase AC source and for generating a reference signal in response to the sensed one reference phase voltage (AB);
- (e) means (36) for dividing a cycle of the one reference phase voltage (AB) into a plurality of phase angles and for generating signals representing the plurality of phase angles in response to the reference signal; and
- (f) means (50) for decoding predetermined signals representing the plurality of phase angles and for generating a plurality of gate pulses in response to the decoded predetermined signals, said silicon controlled rectifiers (1–6) being triggered on in response to the plurality of gate pulses, said means (50) including presettable means (66) for controlling the rate of current build-up and current decay through said inductive load (12).

5. A power supply circuit (20) according to claim 4 wherein said means (36) for dividing includes:
- (a) means (37) for generating a clock frequency being a multiple of the frequency of the reference signal;
- (b) means (44) for counting clock pulses of the clock frequency; and
- (c) means (40) for resetting said counting means (44) in response to the reference signal.

6. A power supply circuit (20) according to claim 5 wherein said means (37) for generating a clock frequency includes a phase lock loop (37).

7. A power supply circuit (20) according to claim 4 wherein said means (50) for decoding and for generating includes:
- (a) a decoder logic network (52);
- (b) means (67) for selectively activating said decoder logic network (52) to decode said predetermined signals for build-up or decay of current through said inductive load (12); and
- (c) means (66) for preselecting any of the predetermined signals representing the plurality of phase angles.

8. A power supply circuit (20) according to claim 4 wherein said means (50) for decoding and for generating includes:
- (a) a decoder logic network (52) being constructed to control current build-up and current decay through said inductive load (12); and
- (b) means (67) for selectively activating said decoder logic network (52) to control current build-up or current decay.

9. A power supply circuit (20) according to claim 4 wherein said means (36) for dividing includes:
- (a) means (37) for generating a clock frequency being a multiple of the frequency of the reference signal;
- (b) means (44) for counting clock pulses of the clock frequency, including
  - (i) a units counter (46) having a plurality of counter outputs (0–9); and
  - (ii) a tens counter (48) having a plurality of counter outputs (0–5); and
- (c) means (40) for resetting said counting means (44) in response to the reference signal.

10. A power supply circuit (20) according to claim 9 wherein said means (50) for decoding and for generating includes a logic network (52) being constructed to control current build-up and current decay through said inductive load (12) and having a plurality of sets (54-64) of logic gates, each of said sets (54-64) having an output (54-5, 56-5, 58-5, 60-5, 62-5, 64-5) being coupled to one of said silicon controlled rectifiers (1-6), respectively, a plurality of inputs being selectively connectable to said plurality of outputs (0-9) of said units counter (46) and a plurality of inputs being connected to said plurality of outputs (0-5) of said tens counter (48).

11. A power supply circuit (20) according to claim 10 wherein said means (50) for decoding and for generating further includes means (67) for selectively activating said decoder logic network (52) to control current build-up or current decay of the current through said inductive load (12).

12. A power supply circuit (20) comprising:
(a) first, second and third conductors (A,B,C) being adapted to carry current of a 3-phase AC source;
(b) an inductive load (12) having a first side (12a) and a second side (12b);
(c) means (24) for coupling the current of the 3-phase AC source between said first, second and third conductors (A,B,C) and said inductive load (12) including
   (i) first, second and third silicon controlled rectifiers (1-3) having anodes connected to said first, second and third conductors (A,B,C), respectively, cathodes connected in common to said first side (12a) of said inductive load (12) and control gates, and
   (ii) fourth, fifth and sixth silicon controlled rectifiers (4-6) having anodes connected in common to said second side (12b) of said inductive load (12), cathodes connected to said second, third and first conductors (B,C,A), respectively, and control gates;
(d) a phase sensor (30) having an input coupled to said first and second conductors (A,B) and an output (32);
(e) a phase lock loop (37) having an input (34) connected to said output (32) of said phase sensor (30) and an output (38);
(f) a resettable units counter (46) having a clock input connected to said output (38) of said phase lock loop (37) and a plurality of counter outputs (0-9);
(g) a resettable tens counter (48) having a plurality of counter outputs (0-5) and being connected to said units counter (46);
(h) means (40) for resetting said units counter (46) and said tens counter (48);
(i) a decoder logic network (52) having six gate control output lines (54-5, 56-5, 58-5, 60-5, 62-5, 64-5) being coupled to said silicon controlled rectifiers (1-6), respectively, a plurality of input lines connected to said counter outputs (0-5) of said tens counter (48) and a plurality of input lines (P,Q) being connectable to said counter outputs (0-9) of said units counter (46); and
(j) means (67) for selectively activating said decoder logic network (52) to control current build-up or current decay through said inductive load (12).

* * * * *